United States Patent
Ma et al.

(10) Patent No.: US 9,524,582 B2
(45) Date of Patent: Dec. 20, 2016

(54) METHOD AND SYSTEM FOR CONSTRUCTING PERSONALIZED AVATARS USING A PARAMETERIZED DEFORMABLE MESH

(71) Applicant: Siemens Aktiengesellschaft, Munich (DE)

(72) Inventors: Kai Ma, Plainsboro, NJ (US); Terrence Chen, Princeton, NJ (US); Vivek Kumar Singh, Monmouth Junction, NJ (US); Yao-jen Chang, Princeton, NJ (US); Michael Wels, Bamberg (DE); Grzegorz Soza, Heroldsberg (DE)

(73) Assignee: Siemens Healthcare GmbH, Erlangen (DE)

(*) Notice: Subject to any disclaimer, the term of this patent is extended or adjusted under 35 U.S.C. 154(b) by 186 days.

(21) Appl. No.: 14/604,829

(22) Filed: Jan. 26, 2015

(65) Prior Publication Data
US 2015/0213646 A1  Jul. 30, 2015

Related U.S. Application Data

(60) Provisional application No. 61/932,441, filed on Jan. 28, 2014.

(51) Int. Cl.
| G06T 17/00 | (2006.01) |
| G06T 17/20 | (2006.01) |
| G06T 7/00 | (2006.01) |
| G06T 19/00 | (2011.01) |

(52) U.S. Cl.
CPC ............ *G06T 17/20* (2013.01); *G06T 7/0051* (2013.01); *G06T 19/00* (2013.01); *G06T 2200/08* (2013.01); *G06T 2207/10012* (2013.01); *G06T 2207/30004* (2013.01); *G06T 2207/30196* (2013.01)

(58) Field of Classification Search
None
See application file for complete search history.

(56) References Cited

U.S. PATENT DOCUMENTS

| 7,978,918 B2 * | 7/2011 | Scalise ............... G06K 9/00234 348/77 |
| 2002/0067362 A1 | 6/2002 | Nocera et al. |

(Continued)

OTHER PUBLICATIONS

Balan et al., The Naked Truth: Estimating Body Shape Under Clothing, 2008, European Conference on Computer Vision, pp. 15-29.*

(Continued)

*Primary Examiner* — Anh-Tuan V Nguyen (57) ABSTRACT

A method and apparatus for generating a 3D personalized mesh of a person from a depth camera image for medical imaging scan planning is disclosed. A depth camera image of a subject is converted to a 3D point cloud. A plurality of anatomical landmarks are detected in the 3D point cloud. A 3D avatar mesh is initialized by aligning a template mesh to the 3D point cloud based on the detected anatomical landmarks. A personalized 3D avatar mesh of the subject is generated by optimizing the 3D avatar mesh using a trained parametric deformable model (PDM). The optimization is subject to constraints that take into account clothing worn by the subject and the presence of a table on which the subject in lying.

44 Claims, 7 Drawing Sheets

(56) References Cited

U.S. PATENT DOCUMENTS

| | | | |
|---|---|---|---|
| 2003/0185436 A1* | 10/2003 | Smith | G06K 9/6232 382/159 |
| 2005/0057569 A1* | 3/2005 | Berger | G06T 13/40 345/473 |
| 2005/0168460 A1* | 8/2005 | Razdan | G06F 17/30398 345/419 |
| 2010/0111370 A1* | 5/2010 | Black | G06K 9/00369 382/111 |
| 2010/0203968 A1 | 8/2010 | Gill et al. | |
| 2010/0317961 A1* | 12/2010 | Jenkins | A61B 5/055 600/411 |
| 2011/0025689 A1* | 2/2011 | Perez | A63F 13/63 345/420 |
| 2011/0115798 A1* | 5/2011 | Nayar | G06T 13/40 345/473 |
| 2011/0298897 A1* | 12/2011 | Sareen | G06N 3/006 348/47 |
| 2012/0070070 A1* | 3/2012 | Litvak | G06K 9/00201 382/154 |
| 2012/0139899 A1 | 6/2012 | Winchester | |
| 2012/0314031 A1* | 12/2012 | Shotton | H04N 13/0203 348/46 |
| 2013/0201187 A1 | 8/2013 | Tong et al. | |
| 2013/0237842 A1* | 9/2013 | Hawkins | A61B 5/0075 600/476 |
| 2013/0279779 A1* | 10/2013 | Darrow | G01R 33/543 382/131 |
| 2013/0286012 A1* | 10/2013 | Medioni | G06T 17/00 345/420 |
| 2013/0329011 A1* | 12/2013 | Lee | G06T 17/00 348/46 |
| 2013/0342527 A1 | 12/2013 | Molyneaux et al. | |
| 2014/0035901 A1* | 2/2014 | Chen | G06T 13/40 345/419 |
| 2014/0043329 A1* | 2/2014 | Wang | G06T 17/20 345/420 |
| 2014/0119640 A1* | 5/2014 | Craig | G06K 9/6217 382/159 |
| 2014/0169623 A1* | 6/2014 | Liu | G06K 9/00342 382/103 |
| 2014/0334670 A1* | 11/2014 | Guigues | G06T 7/2046 382/103 |
| 2014/0341421 A1* | 11/2014 | Porikli | G06K 9/00369 382/103 |
| 2014/0375635 A1* | 12/2014 | Johnson | G06T 17/20 345/420 |
| 2015/0123967 A1* | 5/2015 | Quinn | G06T 13/40 345/420 |
| 2015/0154783 A1* | 6/2015 | Grundhofer | H04N 5/7458 348/745 |
| 2016/0109545 A1* | 4/2016 | Forthmann | G01R 33/543 382/131 |

OTHER PUBLICATIONS

Guan et al., Estimating Human Shape and Pose from a Single Image, 2009, IEEE 12th International Conference on Computer Vision, pp. 1381-1388.*

Hasler et al., Estimating Body Shape of Dressed Humans, 2009, Computer & Graphics, pp. 211-216.*

Dragomir Anguelov et al., "SCAPE: Shape Completion and Animation of People," ACM Trans. Graph, vol. 24 (2005), pp. 408-416.

Peng Guan et al: "A Human Body Model Dressed in Eigen Clothing", Sep. 5, 2010, Computer Vision-ECCV 2010, Springer Berlin Heidelberg, Berlin, Heidelberg, pp. 285-298, XP019150515; 2010.

Hasler N. et al: "Estimating body shape of dressed humans", Computers and Graphics, Elsevier, GB, vol. 33, No. 3, Jun. 2009, pp. 211-216, XP026448475; 2009.

Alexandru O Balan et al: "The Naked Truth: Estimating Body Shape Under Clothing", Oct. 12, 2008, Computer Vision ECCV 2008; [Lecture Notes in Computer Science], Springer Berlin Heidelberg, Berlin, Heidelberg, pp. 15-29, XP019109200; 2008.

PCT International Search Report mailed Jun. 30, 2015 corresponding to PCT International Application No. PCT/US2015/013013 filed Jan. 27, 2015 (17 pages).

* cited by examiner

FIG. 1

Surface    Point Cloud    Polygon Mesh

METHOD AND SYSTEM FOR CONSTRUCTING PERSONALIZED AVATARS USING A PARAMETERIZED DEFORMABLE MESH

This application claims the benefit of U.S. Provisional Application No. 61/932,441, filed Jan. 28, 2014, the disclosure of which is herein incorporated by reference in its entirety.

BACKGROUND OF THE INVENTION

The present invention relates to constructing a personalized avatar of a human subject, and more particularly, to constructing a 3D mesh model of a human subject from a single image obtained using a depth sensor.

Depth sensors are cameras that provide depth information along with typical image information, such as RGB (Red, Green, Blue) data. A depth camera can be a structured light based camera (such as Microsoft Kinect or ASUS Xtion), a stereo camera, or a time of flight camera (such as Creative TOF camera). The image data obtained from a depth camera is typically referred to as RGB-D (RGB+Depth) data, which typically includes an RGB image, in which each pixel has an RGB value, and a depth image, in which the value of each pixel corresponds to a depth or distance of the pixel from the camera. With the advent of Kinect, various approaches have been proposed to estimate a human body skeleton from RGB-D data. However, such approaches typically require multiple sensors or video sequences to obtain a mesh of a person.

SCAPE is a method for human body modeling that is described in Draomir Anguelov et al., "SCAPE: Shape Completion and Animation of People", *ACM Trans. Graph*, Vol. 24 (2005), pp. 408-416. SCAPE is widely used due to its capability to model the human body shape and pose variations in a compact fashion. Instead of learning a complex function for many correlated pose and shape parameters, SCAPE decouples the model and learns a pose deformation model from one person with different poses, and then learns a shape deformation model from different people with one pose. However, SCAPE is only applied to skin clad subjects and does not accurately deal with closing variations and sensor noise.

BRIEF SUMMARY OF THE INVENTION

The present invention provides a method and system for automatic generation of a 3D mesh of a person from an image obtained using a depth camera. Embodiments of the present invention reconstruct a detailed mesh of a person from a single snapshot from a depth camera sensor, even from a partial view of the body. Embodiments of the present invention provide body shape estimation of a person under the clothing and provide sensor noise statistics modeling to obtain precise pose and body shape. Embodiments of the present invention, generate a 3D mesh of a patient and utilize the 3D mesh for medical imaging scan planning.

In one embodiment of the present invention, a depth camera image of a subject to a 3D point cloud. A plurality of anatomical landmarks are detected in the 3D point cloud. A 3D avatar mesh is initialized by aligning a template mesh to the 3D point cloud based on the detected anatomical landmarks. A personalized 3D avatar mesh of the subject is generated by optimizing the 3D avatar mesh using a trained parametric deformable model (PDM).

These and other advantages of the invention will be apparent to those of ordinary skill in the art by reference to the following detailed description and the accompanying drawings.

DETAILED DESCRIPTION

The present invention relates to a method and system for automatic generation of a personalized 3D mesh of a person from an image obtained using a depth camera. Embodiments of the present invention are described herein to give a visual understanding of the personalized mesh generation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention generate a personalized 3D mesh model of a person that estimates the detailed body pose as well as the shape of the person from RGB-D image data obtained from a depth camera, such as a Microsoft Kinect depth camera. Such a personalized 3D mesh model of a person is referred to herein as an avatar. Unlike other approaches to obtain a personalized mesh from multiple sensors of video sequences, embodiments of the present invention generate a personalized mesh from a single snapshot from a depth camera that captures a partial view of the person and deals with body clothing. Embodiments of the present invention provide reconstruction of a detailed body shape (mesh) even from a partial view of the body, body shape estimation from a single snapshot from any depth camera sensor, body shape estimation of the person under the clothing, and appropriate sensor noise statistics modeling to obtain precise body pose and shape.

In order to generate a personalized 3D mesh of a person, embodiments of the present invention, employ a model based approach to fit a human skeleton model to depth image data of the person. The estimated pose skeleton is then used to initialize a detailed parametrized deformable mesh (PDM)

that is learned in an offline training phase. The PDM is then optimized to fit the input depth data by perturbing the body pose and shape. Compared to the SCAPE model, an important difference is the sampling based optimization procedure to fit the PDM to the depth data. Unlike the SCAPE model, which is only applied to data with skin clad subject, embodiments of the present invention utilize this sampling based approach to deal with clothing variations of the subject. Furthermore, the sampling based approach also enables embodiments of the present invention to deal with bias introduce due to sensor noise.

Embodiments of the present invention can be used in a workflow for patient scanning using computed tomography (CT) or positron emission tomography (PET) scanners. In the typical workflow for patient scanning using CT or PET scanners, the radiologist/technician first roughly estimates the patient iso-center of the scan region by observing the patient contour from profile viewpoint, and then aligns the patient iso-center with the scanner gantry center that is usually reflected by the laser projection. If the alignment is perfectly conducted, the best imaging quality will be achieved. However, the current alignment done by the radiologist/technician is inaccurate and inconsistent. Embodiments of the present invention can be used to generate a personalized 3D avatar mesh that accurately fits the patient, which will be further used to calculate the iso-center of the scan region. Compared to the traditional workflow used by the radiologist/technician, this can provide a more accurate and consistent estimation of the iso-center. In addition, in the typical workflow for patient scanning using CT or PET scanners, a topogram (x-ray) image is first generated with the scanner to help the radiologist determine the necessary scan region. Embodiments of the present invention can be used to generate a personalized 3D avatar mesh that accurately fits the patient from a snapshot obtained using a depth camera, and the personalized 3D avatar mesh can be used in place of the topogram to predict the position of organs in the patient's body in order to determine the scan region. This can provide a more accurate estimation of the scan range for an organ and decrease the patient's exposure to radiation.

In computer graphics, 3D object shapes are generally represented by three-dimensional (3D) surfaces X. Two popular ways to represent a 3D surface is using a point cloud (generated by point sampling the surface) and using a polygon mesh (generated by polygonal approximation of the surface). A point cloud is generally viewed as a collection of sensor readings of the object surface, where each element in the cloud represents the 3D coordinate of a surface point. Although point clouds may be more computationally manageable than other models, especially for complex surfaces, point cloud discard information about the surface continuity, including the topology of surface connectivity. A point cloud of a surface X can be denoted as $P^X = (p_1, \ldots, p_k)$. This is a common way to represent data obtained from 3D acquisition devices, such as the Microsoft Kinect depth camera.

Figure 1:
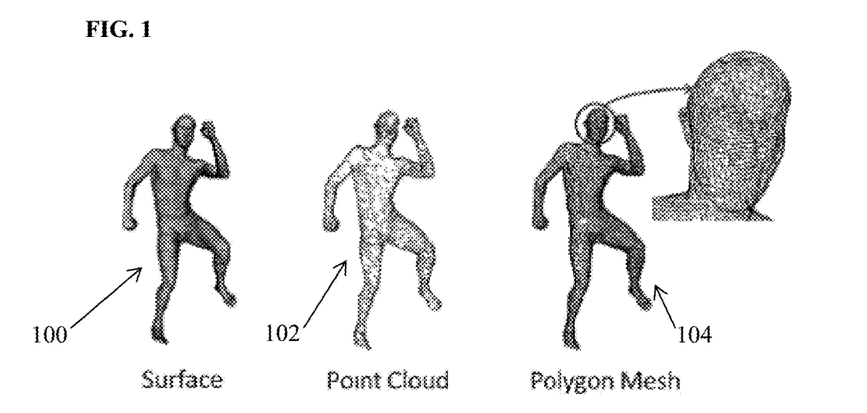
FIG. 1 illustrates an example of representing a surface using point cloud and polygon mesh.

A polygon mesh is a collection of vertices and edges that defines the shape of an object. A polygon mesh of a surface X can be denoted as $M^X = (P^X, V^X)$, where $P^X = (p_1, \ldots, p_k)$ represents the vertices and $V^X = (v_1, \ldots, v_k)$ includes the vertex indices that define the edges of the current polygon. Triangles are commonly used as polygons in the mesh, and each triangle $t_k$ is represented using three vertices ($p_{1,k}, p_{2,k}, p_{3,k}$) and three edges ($v_{1,k}, v_{2,k}, v_{3,k}$). It is to be understood that the present invention is not limited to polygon meshes using triangles and other polygons, such as tetrahedrons, may be also be used in a polygon mesh. FIG. 1 illustrates an example of representing a surface using point cloud and polygon mesh. As shown in FIG. 1, human body surface 100 is represented using a point cloud 102 and a polygon mesh 104.

Embodiments of the present invention utilize a learned parametric deformable model (PDM) of the human body to generate the personalized avatar model for a patient. The PDM divides the full human body deformation into two separate deformations, pose and shape deformations, where the pose deformation can be further divided into rigid and non-rigid deformations. According to an advantageous implementation, the human body can be represented using a polygon mesh comprising a set of triangles. Therefore, the triangles $t_k^i$ in any given mesh $M^i$ representing the human body can be represented as the triangles of a template mesh $\hat{M}$ with some deformations. The triangles in the template mesh are denoted as $\hat{t}_k$ and two edges of each triangle are denoted as $\hat{v}_{k,j}, j=2,3$. Then, the triangles in $M^i$ can be represented as:

$$v_{k,j}^i = R_{l[k]}^i S_k^i Q_k^i \hat{v}_{k,j}, \quad (1)$$

where $R_{l[k]}^i$ is the rigid rotation that has the same value for all of the triangles belonging to the same body part l, $S_k^i$ is the shape deformation matrix, and $Q_k^i$ is the pose deformation matrix.

In order to learn a pose deformation model from a set of training data, a regression is learned for each triangle $t_k$, which estimates the pose deformation matrix Q as a function of the twists of its two nearest joints $\Delta r_{l[k]}^i$, $$Q_{k,l[m]}^i = \Gamma_{a_{k,l[m]}}^T (\Delta r_{l[k]}^i) = a_{k,l[m]}^T \begin{bmatrix} \Delta r_{l[k]}^i \\ 1 \end{bmatrix}. \quad (2)$$

In the above equation, $\Delta r$ can be calculated from the rigid rotation matrix R. If Q is given, the regression parameter a can be easily calculated. However, the non-rigid deformation matrix Q for each triangle is unknown. Accordingly, the deformation matrices for each of the triangles are solved by solving an optimization problem that minimizes the distance between the deformed template mesh and the training mesh data subject to a smoothness constraint. This optimization problem can be expressed as:

$$\underset{\{Q_1^i \ldots Q_P^i\}}{\text{argmin}} \sum_k \sum_{j=2,3} \|R_k^i Q_k^i \overline{v}_{k,j} - v_{k,j}^i\|^2 + w_s \sum_{k_1, k_2 adj} I(l_{k_1} = l_{k_2}) \|Q_{k_1}^i - Q_{k_2}^i\|^2, \quad (3)$$

where the first term minimizes the distance between the deformed template mesh and the training mesh data and the second term is a smoothness constraint that prefers similar deformations in adjacent triangles that belong to the same body part. $w_s$ is a weight that can be used to tune the smoothness constraint and $I(l_{k_1} = l_{k_2})$ is equal to the identity matrix I when the adjacent triangles belong to the same body part and equal to zero when the adjacent triangles do not belong to the same body part.

Figure 2:
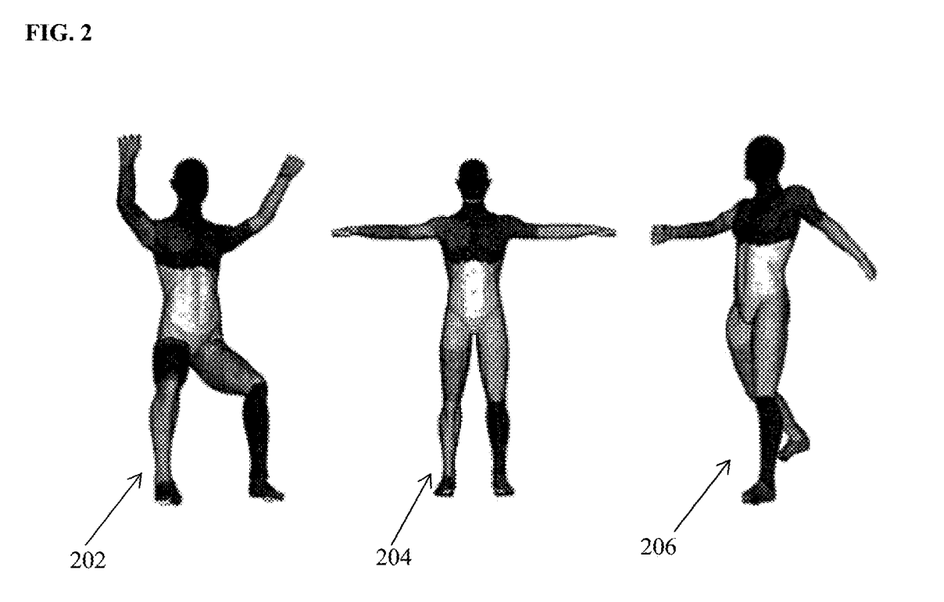
FIG. 2 illustrates examples of pose deformations obtained from a trained pose deformation model.

After training of the pose deformation model, the mesh model can be manipulated to form different body poses by initializing the rigid rotation matrix R with different values. FIG. 2 illustrates examples of pose deformations obtained from a trained pose deformation model. As shown in FIG. 2, image 202 shows a driving pose obtained using the trained pose deformation model, image 204 shows the template pose, and image 206 shows a walking pose obtained using the trained pose deformation model. The pose deformations of FIG. 2 were obtained using a pose deformation model trained with 200 training instances having different poses.

In order to learn the shape deformation from a set of training data, principle component analysis (PCA) is employed to model shape deformation matrices as a linear combination of a small set of eigenspaces, $$S_k^i = F_{U_k, \mu_k}(\beta_k^i) = U_k \beta_k^i + \mu_k. \quad (4)$$

In equation (4), F is the function of PCA coefficient $\beta$, $\mu$ is the mean vector, and U is the eigenvector of the data when doing the PCA dimension reduction. Similar to the pose estimation, the shape deformation matrix S for each triangle is unknown. Again, an optimization problem that minimizes the distance between the deformed template mesh and the training mesh data subject to a smoothness constraint is used to estimate the matrix S:

$$\operatorname*{argmin}_{S^i} \sum_k \sum_{j=2,3} \| R_k^i Q_k^i \hat{v}_{k,j} - v_{k,j}^i \|^2 + w_s \sum_{k_1, k_2 \text{adj}} \| S_{k_1}^i - S_{k_2}^i \|^2, \quad (5)$$

where the first term minimizes the distance between the deformed template mesh and the training mesh data and the second term is a smoothness constraint that prefers similar shape deformations in adjacent triangles.

Figure 3:
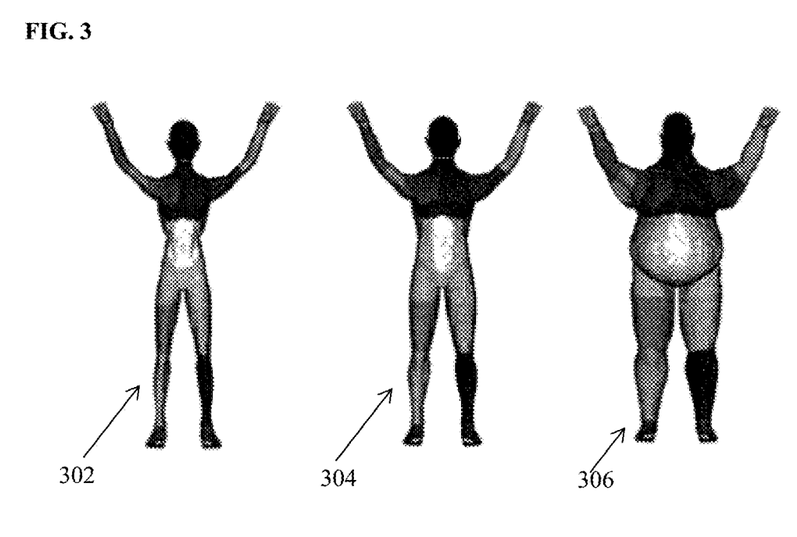
FIG. 3 illustrates examples of shape deformations obtained using a trained shape deformation model.

Once the PCA parameters (i.e., set of eigenvectors) are obtained, the mesh model can be manipulated to form different body shapes (tall to short, underweight to overweight, strong to slim, etc.) by perturbing $\beta$. FIG. 3 illustrates examples of shape deformations obtained using a trained shape deformation model. The shape deformations of FIG. 3 are obtained by PDM shape deformation along the direction of the first principal component ($\beta$). As shown in FIG. 3, image 302 shows an extreme case of an underweight body shape obtained using the trained shape deformation model, image 304 shows the template mesh, and image 306 shows an extreme case of an overweight body shape obtained using the trained shape deformation model. The shape deformations of FIG. 3 were obtained using a shape deformation model trained with 200 training instances having different body shapes.

The training process to train the pose deformation model and shape deformation model for the PDM requires a large number of 3D mesh training examples. Building such a dataset from real human models is one plausible solution, but it is expensive and time-consuming. Building the training dataset from real human models requires a high-precision laser scanner that captures each person from different viewing angles. Then, a registration algorithm needs to be applied to construct the full body model for each person from the partial views. In addition, filling holes, removing noises, and smoothing surfaces may also require tremendous human efforts.

Figure 4:
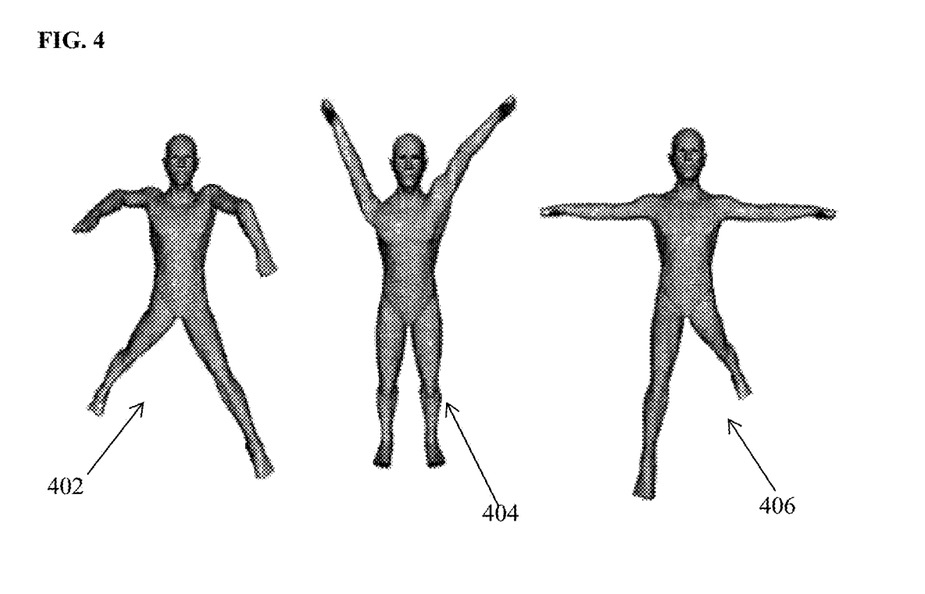
FIG. 4 illustrates synthetic mesh instances having different poses.
Figure 5:
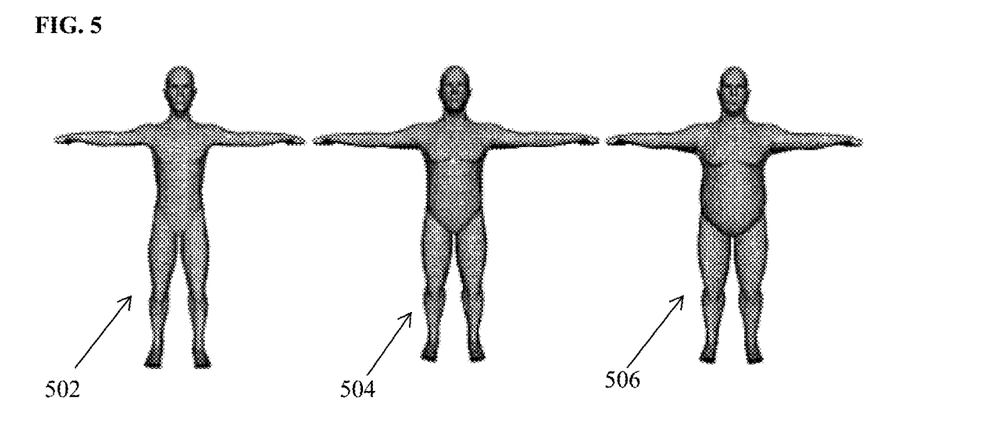
FIG. 5 illustrates synthetic mesh instances having different body shapes.

In an advantageous embodiment of the present invention, synthetic human models can be used to train the PDM. Compared to using real human models, synthetic human models from 3D commercial software is much simpler and faster to generate. In an exemplary implementation, a 3D animation software called POSER can be used to generate synthetic human models to populate the training dataset. POSER is a 3D rendering software that can be used for posing and animation of 3D polygon meshes of humans. This software comes with a library of pre-built human models with large freedom of joint and shape parameters. Together with the Python programming interface, POSER can generate thousands of 3D human mesh instances with different poses and shapes in about an hour. Another advantage of using POSER is that all of the mesh instances originated from the same mesh template are fully labeled and registered. For example, the number of vertices in each mesh instance is the same as the template mesh and the vertex order remains the same no matter what kind of pose the mesh forms. However, there are two issues with using POSER to generate the meshes for the training dataset. First, the data generation is fully unsupervised with only some initial user input, so some poses can be generated that are unrealistic to a real person. Accordingly, it may be necessary to examine the meshes generated using POSER and manually remove the unrealistic meshes. Second, POSER itself does not simulate the gravity effect of the human body, so a person with a standing pose had the same body shape as that person in a lying down pose. FIG. 4 illustrates mesh instances 402, 404, and 406 in different poses generated using POSER. FIG. 5 illustrates mesh instances 502, 504, and 506 having different body shapes generated using POSER.

In the original SCAPE work, the pose deformation model is trained with different mesh instances of the same human subject in various poses, while the shape deformation model is trained with mesh instances from many subjects in a neutral pose. However, such decoupling of the shape and pose deformation can lead to problems. For example, if the human subject is male for the pose training data, then the pose and shape estimation for a given female subject will not be accurate. According to an advantageous embodiment of the present invention, we have a strong prior that the gender of the test subject is known, so such decoupling is not a problem. According to an advantageous implementation, two separate pose deformation models (male and female) are trained and the appropriate one of the trained pose deformation models is applied when generating a personalized avatar mesh for a patient according to the known gender of the patient.

Figure 6:
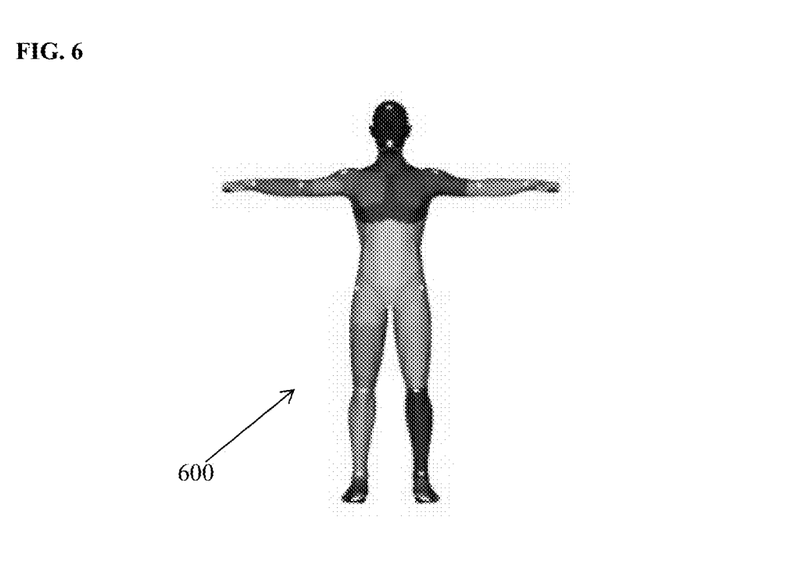
FIG. 6 illustrates an example of a template mesh model.

Among all of the training mesh instances, a person with a regular (e.g., average or median) body size and a neutral pose is selected as the template mesh. The full body of the template mesh is divided into a plurality of different body parts and a plurality of joint landmarks on the template mesh are manually selected. According to an exemplary implementation, the template mesh can be divided into 18 body parts and 16 points on the template mesh are selected as joint landmarks. In this exemplary implementation, the 18 body parts (and indices used to identify the body parts) are as follows: left and right foot (0,1), left and right lower leg (2,3), left and right upper leg (4,5), pelvis (6), left and right hand (7,8), left and right forearm (9,10), left and right upper arm (11,12), abdomen (13), chest (14), left and right shoulder (15, 16), and head (17). The joint landmarks correspond to locations of various joints and other significant anatomical locations. In the exemplary implementation, the 16 joint landmarks (and indices identifying the landmarks) are as follows: left and right ankle (0,1), left and right knee (2,3), left and right waist (4,5), groin (6), left and right wrist (7,8), left and right elbow (9,10), left and right shoulder top (11,12), chest center (13), head bottom (14), and head top (15). FIG. 6 illustrates an example of a template mesh model. As shown in FIG. 6, the template mesh model 600 is divided into 18 body parts (left and right foot, left and right lower leg, left and right upper leg, pelvis, left and right hand, left and right forearm, left and right upper arm, abdomen, chest, left and right shoulder, and head) and annotated with 16 joint landmarks (left and right ankle, left and right knee, left and right waist, groin, left and right wrist, left and right elbow, left and right shoulder top, chest center, head bottom, and head top).

Figure 7:
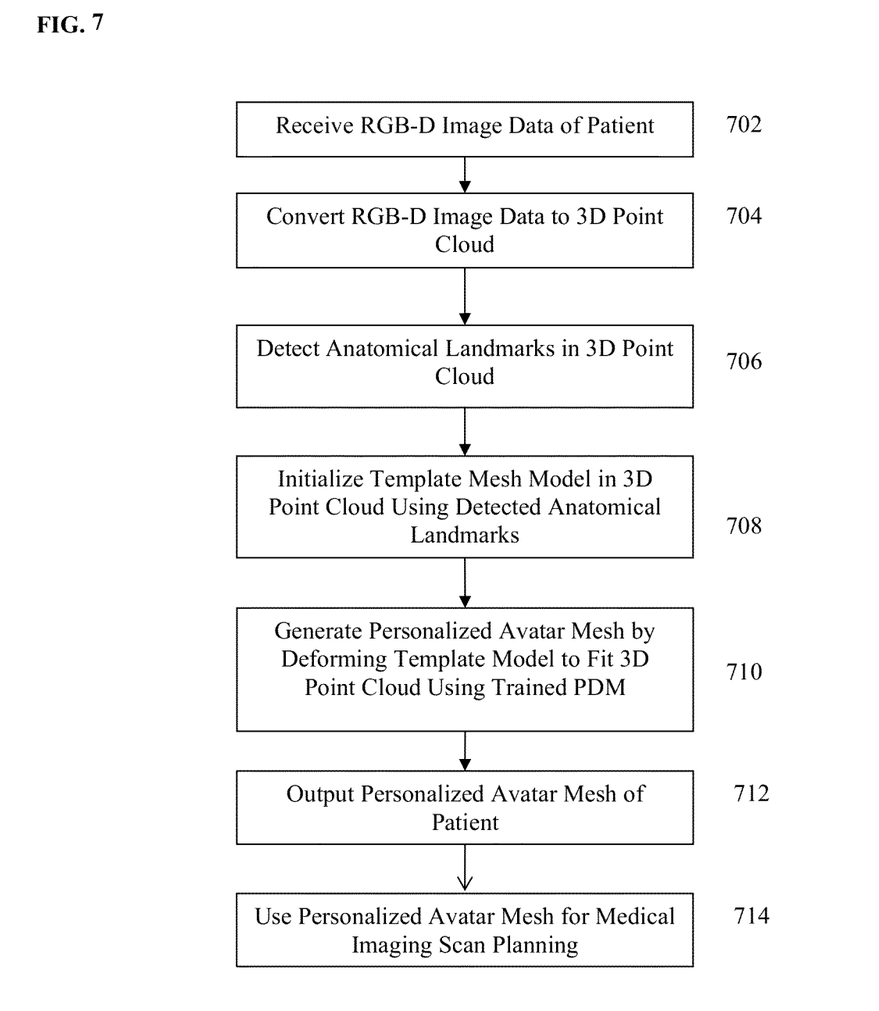
FIG. 7 illustrates a method of generating a personalized 3D avatar mesh model for a patient according to an embodiment of the present invention.
Figure 8:
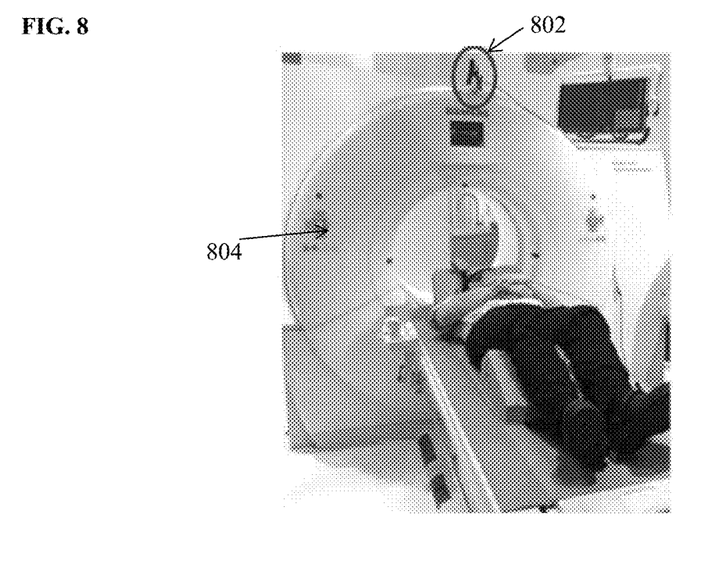
FIG. 8 shows an example of a depth camera sensor mounted on a CT scanner.

FIG. 7 illustrates a method of generating a personalized 3D avatar mesh model for a patient according to an embodiment of the present invention. The method of FIG. 7 can be used as part of a scanning planning procedure to plan a scan for acquiring medical image data of a patient, such as a CT scan or a PET scan. The method of FIG. 7 utilizes priors, such as the knowledge that the patient is lying on a table, and the knowledge that the patient is covered with clothing, a radiation protector, blankets, pillows, etc., and applies constraints corresponding to such priors to the generation of the 3D avatar mesh model for the patient. Referring to FIG. 7, at step 702, RGB-D image data of a patient is received from a depth camera. In an exemplary embodiment, the RGB-D image data can be obtained in a single snapshot from the depth camera. The depth camera can be a structured light based camera (such as Microsoft Kinect or ASUS Xtion), a stereo camera, or a time of flight camera (such as Creative TOF camera). The RGB-D (RGB+Depth) image data includes an RGB image, in which each pixel has an RGB value, and a depth image, in which the value of each pixel corresponds to a depth or distance of the pixel from the camera. Assuming the patient is on a table for medical image acquisition, the depth camera should be appropriately mounted such that it has an unobstructed view of the patient on the table. For example, the depth camera may be mounted on a ceiling above the table or on the medical image scanner. FIG. 8 shows an example of a depth camera sensor 802 mounted on a CT scanner 804. The RGB-D image data can be received directly from the depth camera, or can be received by loading previously acquired RGB-D image data of a patient.

Returning to FIG. 7, at step 704, the RGB-D image data is converted to a 3D point cloud. In particular, the depth image of the RGB-D image data is used to map each pixel in the RGB image to a 3D location, resulting in a 3D point cloud representing the patient.

At step 706, anatomical landmarks are detected in the 3D point cloud. In particular, each of the joint landmarks selected in the template mesh is detected in the 3D point cloud. The joint landmarks can be detected in the 3D point cloud using trained machine learning based classifiers trained based on annotated training data. For example, a respective probabilistic boosting tree (PBT) classifier can be trained for each of the joint landmarks and each joint landmark can be detected by scanning the 3D point cloud using the respective trained PBT classifier. It is also possible that the relative locations of the landmarks can be utilized in the landmark detection. For example, the trained classifiers for each of the joint landmarks can be connected in a discriminative anatomical network (DAN) to take into account the relative locations of the landmarks, or the trained classifiers can be applied to the 3D point cloud in a predetermined order where each landmark that is detected helps to narrow the search range for the subsequent landmarks. In other possible implementation, PBT classifiers can be trained to detect a plurality of body parts (e.g., head, torso, pelvis) and the detected body parts can be used to constrain the search range for the PBT classifiers used to detect the joint landmarks.

At step 708, the template mesh model is initialized in the 3D point cloud using the detected anatomical landmarks. As described above the template mesh model is a mesh selected from the meshes in the training dataset that has a regular (e.g., average or median) body size and a neutral pose. The template mesh model is divided into a plurality body parts and a corresponding location for each of the plurality joint landmarks on the template mesh is stored. The template mesh is initialized in the 3D point cloud by calculating a rigid transformation of the template mesh to the 3D point cloud that minimizes error between the detected locations of the joint landmarks in the 3D point cloud and the corresponding locations of the joint landmarks in the template mesh. This rigid transformation provides and initial rigid rotation matrix R, which when applied to the template mesh results in an initialized avatar mesh model.

At step 710, a personalized avatar mesh is generated by deforming the template mesh to fit the 3D point cloud using the trained parametric deformable model (PDM). As described above, the PDM is trained offline by training a pose deformation model and a shape deformation model from the training data. In step 710, the trained PDM is directly applied to the task of data completion. Given the 3D point cloud and the joint landmarks, the PDM can generate a realistic full 3D mesh output that is consistent with the partial data by minimizing the objective function:

$$\underset{\{\beta, \Delta r, y_k\}}{\text{argmin}} \sum_{k} \sum_{j=2,3} \|R_k F_{U,\mu}(\beta) \Gamma_{a_k}(\Delta r_{l[k]}) \hat{v}_{k,j} - (y_{j,k} - y_{1,k})\|^2 + \qquad (6)$$

$$w_z \sum_{l=1}^{L} w_l \|y_l - z_l\|^2,$$

where $R_k$ is the rigid rotation matrix, $F_{U,\mu}(\beta)$ is the trained shape deformation model, $\Gamma_{a_k}(\Delta r_{l[k]})$ is the trained pose deformation model, $\hat{v}_{k,j}$ denotes edges of a triangle in the template mesh, y denotes vertices of the estimated avatar mesh model, and L is the set of correspondences between the avatar vertex $y_l$ and the corresponding point $z_l$ in the 3D point cloud Z. The first term of this objective function defines the mesh output to be consistent with the learned PDM model and the second term regulates the optimization to find the set that best fits the input point cloud. To balance the importance of the two terms, a weighting term $w_z$ is applied.

One significant difference between the PDM utilized in embodiments of the present invention and SCAPE is the addition of another weight term $w_l$ in Equation (6). In the original SCAPE work, the input data id from a laser scan, so each point can be equally weighted. In the method of FIG. 7, however, the input is from a depth camera sensor, where the data accuracy may be affected by the actual distance between the depth camera sensor and each point. Accordingly, the present inventors have created a noise model to simulate the effects of distance from the depth camera on the accuracy of the points in the 3D point cloud. The noise model generates a different value of $w_l$ for each registered point (e.g., each joint landmark) based on a distance of each joint landmark from the depth camera.

In Equation (6) there are three parameter sets (R, Y, and β) to be optimized. This forms a standard non-linear and non-convex optimization problem. In order to avoid the possibility of converging to a sub-optimal solution, embodiments of the present invention utilize an iterative process to optimize the three parameters. In particular, the three sets of parameters are treated separately, optimizing only one of them at a time while keeping the other two fixed. According to an advantageous embodiment of the present invention, a three-step optimization can be performed as follows:

(1) Optimize R with S and Y fixed, then update ΔR and Q accordingly;
(2) Optimize Y with R and S fixed; and
(3) Optimize S with R, Q, and Y fixed.

In step (1) of three-step optimization procedure, the rigid rotation matrix R is optimized using Equation (6) while the shape deformation S and the vertices Y of the estimated avatar mesh model are fixed. This results in an updated value of Δr for each triangle in the estimated avatar mesh model and the pose deformation Q for each triangle is updated based on the updated Δr using the trained posed deformation model $\Gamma_{ak}(\Delta r_{l[k]})$. Accordingly, step (1) of the optimization procedure optimizes the pose of the estimated avatar model. In step (2) of the three-step optimization procedure, the locations of the vertices Y of the estimated avatar mesh are optimized using Equation (6) while the shape deformation S and rigid rotation matrix R (and pose deformation) are fixed. This step is a fine-tuning step that adjusts the locations of the vertices Y to better match the 3D point cloud. In step (3) of the optimization procedure, the shape deformation S is optimized using Equation (6) while the rigid rotation matrix R, the pose deformation Q, and the vertices Y of the estimated avatar mesh are fixed. In particular, first principal component β is adjusted to find the shape deformation calculated using the trained deformation model $F_{U,\mu}(\beta)$ that minimizes the objective function in Equation (6). Accordingly, the three-step optimization procedure first finds an optimal pose deformation, then performs fine-tuning adjustments of the vertices of the estimated avatar model, and then finds an optimal shape deformation. This three-step optimization procedure can be iterated a plurality of times. For example, the three-step optimization procedure can be iterated a predetermined number of times or can be iterated until it converges.

The second term in Equation (6) requires finding correspondences between the 3D point cloud and landmarks on the 3D mesh model. In the method of FIG. 7, we first estimate an initial R based on the detected joint landmarks in the 3D point cloud (step 708). Then, the above three-step optimization procedure is iterated a plurality of times to get a current estimated mesh model, $M_{curr}$, where only the joint landmarks are used to find the correspondences. For example, the three-step optimization procedure using only the joint landmarks to find the correspondences can be iterated a predetermined number of times or can be iterated until it converges. Next, a registration algorithm based on the Iterative Closest Point algorithm can be performed to obtain a full registration between the 3D point cloud and the current 3D mesh model $M_{curr}$. Once the registration between the 3D point cloud and the current 3D mesh model $M_{curr}$ is performed, correspondences between corresponding pairs of points in the 3D point cloud and the current 3D mesh model that have a distance ($\|y_l - z_l\|$) larger than a predetermined threshold are removed. The remaining correspondences are then used to estimate a new rigid rotation matrix R, and the three-step optimization procedure is repeated. This optimization-registration process is iterated until convergence.

The optimization procedure described above for partial data completion using the trained PDM generates a plausible 3D avatar that closely fits to the actual pose and shape of the patient. However, the system accuracy may be sabotaged due to the effect of clothing worn by the patient. Since the template avatar is generated from PSOER in a naked scenario, but the 3D point cloud is captured from a real patient who is typically wearing clothes, solving Equation (6), which minimizes the differences between the avatar mesh surface and the 3D point cloud, will likely result in errors. This situation is particularly severe when the patient dresses in loose clothes. In an advantageous embodiment of the present invention, a new optimization method that deals with the clothing effect is utilized.

In order to deal with the effect of clothing worn by the patient, embodiments of the present invention search for a 3D avatar mesh model having vertices that are all beneath the input 3D point cloud to some degree. To that end, a clothing constraint $d_{cloth}$ can be defined as:

$$d_{cloth}(Y) = \Sigma_{l \in L} \|\epsilon_l + n_{z_l}^T(z_l - y_l)\|^2, \quad (7)$$

where L is the set of correspondences between the avatar vertex $y_l$ and the corresponding point $z_l$ in the 3D point cloud, and $n_{z_l}$ is the normal of the point $z_l$. The avatar mesh is below the 3D point cloud when $n_{z_l}^T(z_l - y_l) > 0$, $\forall l \in L$. The term $\epsilon_l \le 0$ ensures that the avatar mesh lies sufficiently below the input 3D point cloud within the clothing region while the avatar overlaps with the input 3D point cloud in the non-clothing region. The value of $\epsilon$ is determined by:

$$e_k = (1 - P(y_k))\tau, \quad (8)$$

where $k \in X$, $P(y_k)$ represents the probability that an avatar vertex $y_k$ belongs to a non-clothing region. The probability P(Y) is calculated using a trained probability model that is learned statistically from ground truth training data. The threshold τ represents the maximal distance between the avatar surface and the clothing surface, including the thickness of the clothing. It is to be understood that the clothing constraint can be applied, not just for clothing, but for anything covering the patient, such as a radiation protector, blankets, pillows, etc. Since what is covering the patient can be known as a prior, different probability models can be trained for different patient coverings (e.g., clothing, radiation protector, blanket, etc.), and the threshold τ can be adjusted based on what is covering the patient.

Since, in an advantageous embodiment, the input 3D point cloud data is generated from RGB-D image data collected from the patient lying on a table, another constraint $d_{table}$, referred to herein as the table constraint, can be utilized to specify that all vertices of the avatar mesh should be above the table. In particular, we attempt to minimize:

$$d_{table}(y) = \Sigma_{k \in X, y_k^z < h_{table}} \|\epsilon_{table} + y_k^z - h_{table}\|^2, \quad (9)$$

where $y_k^z$ is the z-axis value (perpendicular to the surface of the table) of the avatar vertex $y_k$, $h_{table}$ is the current table height (which is known), and the term $e_{table}$ ensures that the avatar mesh lies sufficiently above the table.

The above equations have many solutions. To achieve an avatar mesh that is deformed plausibly, the solution can be regularized with a smoothing term, which minimizes:

$$s(y) = \sum_{k \in X} \left\| (y_k - \hat{y}_k) - \frac{1}{[N_k]} \sum_{j \in N_k} (y_j - \hat{y}_j) \right\|^2, \quad (10)$$

where y denotes the vertices of the new avatar mesh, $\hat{y}$ denotes the vertices of the current avatar mesh, and $N_k$ is the set of vertices adjacent to the vertex $y_k$. This regularization prefers a deformation of a vertex that is similar to the average deformation of its neighboring vertices.

According to an embodiment of the present invention, the above described constraints can be combined to get an optimization function that minimizes:

$$E[Y] = \Sigma_k \Sigma_{j=2,3} \|R_k F_{U,\mu} \Gamma_{a_k} \hat{v}_{k,j} - (y_{j,k} - y_{1,k})\|^2 + d_{cloth}(Y) + d_{table}(Y) + s(Y), \quad (11)$$

where first term is the same as the first term in Equation (6), the second term is the clothing constraint $d_{cloth}(Y)$ defined in Equation (7), the third term is the table constraint $d_{table}(Y)$ defined in Equation (9), and the fourth term is the smoothing constraint $s(Y)$ defined in Equation (10). The cost function of Equation (11) can be used in place of the cost function expressed in Equation (6) to optimize the parameter sets (R, Y, and β). In particular, the iterated optimization-registration process described above (including the iterated three-step optimization procedure) can be used to find the optimal parameters to minimize the cost function of Equation (11). This procedure is iterated until convergence, resulting in a 3D personalized avatar mesh for the patient.

Returning to FIG. 7, at step 712, the 3D personalized avatar mesh for the patient is output. For example the 3D personalized avatar mesh can be output by displaying the 3D personalized avatar mesh on a display screen of a computer system.

At step 714, the 3D personalized avatar mesh of the patient is used for medical imaging scan planning. In one implementation, the 3D personalized avatar mesh can provide a prediction of locations of the patient's organs. For example, an atlas of organs can be aligned with the 3D personalized avatar mesh for the patient and superimposed on the patient body. This can assist an operator in specifying a scan range of a specific organ for a medical imaging (e.g. CT or PET) scan. The 3D personalized avatar mesh of the patient can be used in place of a topography scan to plan a CT or PET scan. In the current workflow, the best CT scan quality is to be expected for image regions in the center of gravity, the so-called iso-center. Since the 3D avatar mesh accurately fits to the patient, the iso-center of the scan can also be estimated from the 3D avatar mesh with minimum error, thus helping to generate high quality CT scan images.

Figure 9:
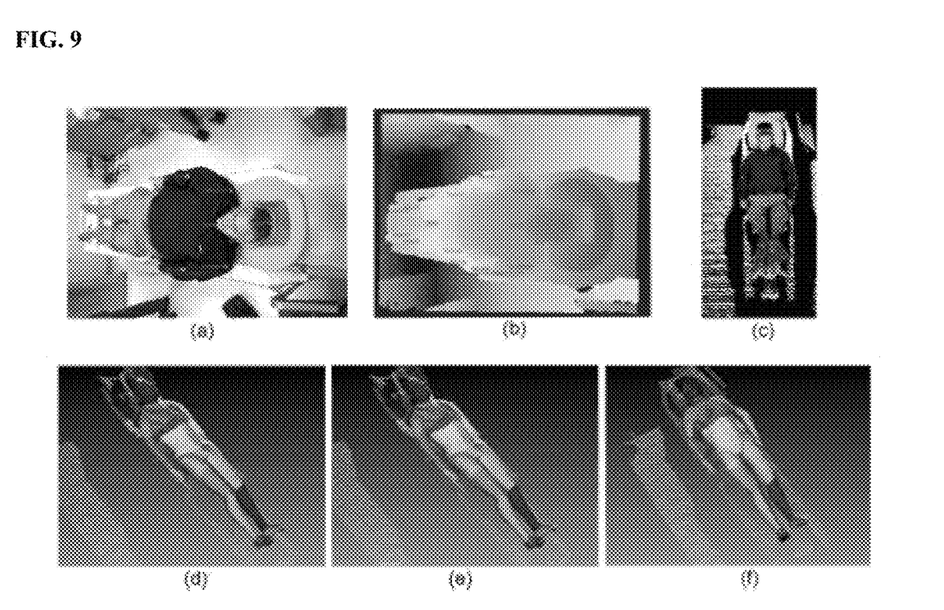
FIG. 9 illustrates exemplary results of generating a personalized avatar mesh from RGB-D image data using a trained PDM.

FIG. 9 illustrates exemplary results of generating a personalized avatar mesh from RGB-D image data using a trained PDM. As shown in FIG. 9, image (a) shows an RGB image and image (b) shows the corresponding depth image. Image (c) shows the RGB-D image data re-projected as a 3D point cloud as seen from above the table. Image (d) shows the PDM initialization to the detected joint landmarks. Image (e) shows the estimated 3D avatar mesh after four iterations of optimization, and image (f) shows the final personalized 3D avatar mesh obtained using the PDM.

Figure 10:
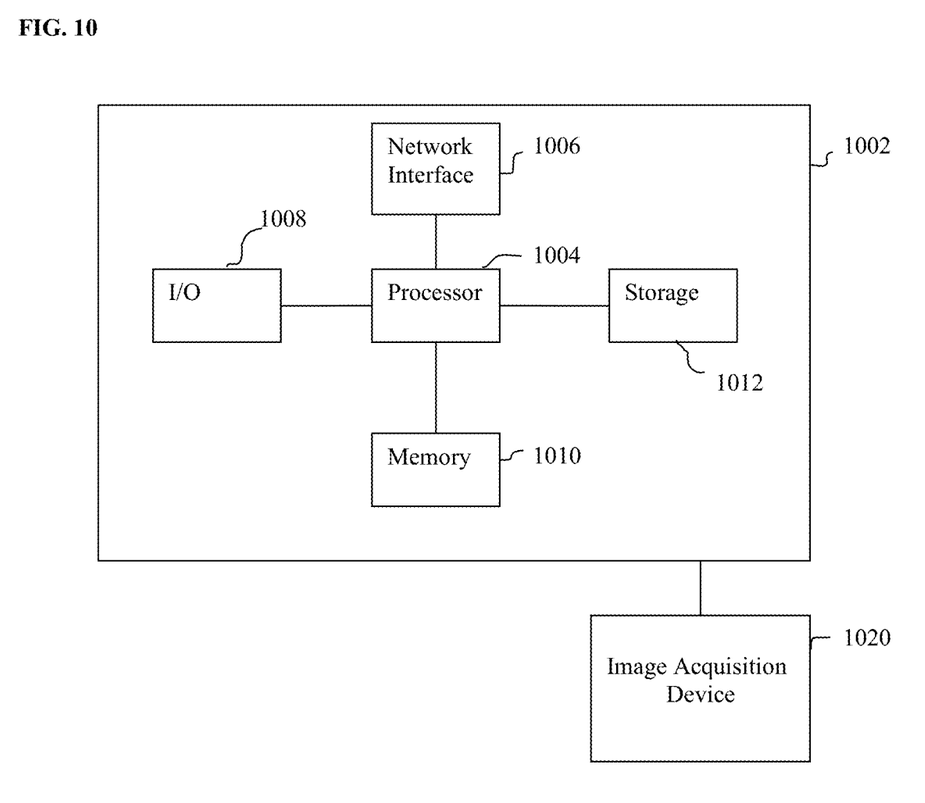
FIG. 10 is a high-level block diagram of a computer capable of implementing the present invention.

The above-described methods for generating a 3D personalized avatar mesh of a person may be implemented on a computer using well-known computer processors, memory units, storage devices, computer software, and other components. A high-level block diagram of such a computer is illustrated in FIG. 10. Computer 1002 contains a processor 1004, which controls the overall operation of the computer 1002 by executing computer program instructions which define such operation. The computer program instructions may be stored in a storage device 1012 (e.g., magnetic disk) and loaded into memory 1010 when execution of the computer program instructions is desired. Thus, the steps of the method of FIG. 7 may be defined by the computer program instructions stored in the memory 1010 and/or storage 1012 and controlled by the processor 1004 executing the computer program instructions. A depth camera 1020 can be connected to the computer 1002 to input RGB-D image data to the computer 1002. The depth camera 1020 and the computer 1002 may be directly connected or may communicate wirelessly through a network or other wireless communication protocol. A medical image acquisition device (not shown), such as a CT scanning device, can also be connected to the computer 1002 to input medical image data to the computer 1002. It is also possible to implement the medical image acquisition device and the computer 1002 as one device. The computer 1002 also includes one or more network interfaces 1006 for communicating with other devices via a network. The computer 1002 also includes other input/output devices 1008 that enable user interaction with the computer 1002 (e.g., display, keyboard, mouse, speakers, buttons, etc.). Such input/output devices 1008 may be used in conjunction with a set of computer programs as an annotation tool to annotate volumes received from the image acquisition device 1020. One skilled in the art will recognize that an implementation of an actual computer could contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method of generating a personalized 3D avatar mesh of a human subject from a depth camera image for medical imaging scan planning, comprising:
   converting a depth camera image of a subject to a 3D point cloud;
   detecting a plurality of anatomical landmarks in the 3D point cloud;
   initializing a 3D avatar mesh by aligning a template mesh to the 3D point cloud based on the detected anatomical landmarks; and
   generating a personalized 3D avatar mesh of the subject by optimizing the 3D avatar mesh using a trained parametric deformable model (PDM)
   wherein generating a personalized 3D avatar mesh of the subject by optimizing the 3D avatar mesh using a trained parametric deformable model (PDM) comprises:
   optimizing parameters of the trained PDM that control a pose and shape of the 3D avatar mesh and locations of vertices of the 3D avatar mesh to minimize a cost function, and wherein the cost function includes a table constraint that causes the optimization to move vertices of the 3D avatar above a table on which the subject is lying.

2. The method of claim 1, wherein the depth camera image comprises an red, green, blue (RGB) image and a depth image, and converting a depth camera image of a subject to a 3D point cloud comprises:
   for each of a plurality of pixels in the RGB image, mapping that pixel to a location in the 3D point cloud based on a corresponding depth value in the depth image.

3. The method of claim 1, wherein detecting a plurality of anatomical landmarks in the 3D point cloud comprises:
   detecting a plurality of joint landmarks corresponding to locations of the subject's joints in the 3D point cloud.

4. The method of claim 1, wherein detecting a plurality of anatomical landmarks in the 3D point cloud comprises:
   detecting each of the plurality of anatomical landmarks using a respective trained classifier.

5. The method of claim 1, wherein the trained PDM comprises a trained pose deformation model and a trained shape deformation model.

6. The method of claim 5, wherein the trained PDM is trained based on a plurality of training instances and the plurality of training instances comprises a plurality of synthetic human meshes having a plurality of poses and body shapes generated using a 3D rendering software.

7. The method of claim 1, wherein the cost function includes a clothing constraint that causes the optimization to move vertices of the 3D avatar in a clothing region below corresponding points of the 3D point cloud.

8. The method of claim 7, wherein the clothing constraint is based on a probability calculated for each vertex of the 3D avatar mesh that the vertex in is a non-clothing region and the probability for each vertex is calculated using a trained probability model.

9. The method of claim 1, wherein the cost function includes smoothness constraint that penalizes deformations of a vertex in the 3D avatar mesh that are different from an average deformation of neighboring vertices to that vertex.

10. The method of claim 1, wherein the cost function to be minimized is:

$$\Sigma_k \Sigma_{j=2,3} \|R_k F_{U,\mu} \Gamma_{a_k} \hat{v}_{k,j} - (y_{j,k} - y_{1,k})\|^2 + d_{cloth}(Y) + d_{table}(Y) + s(Y),$$

where $R_k$ is the rigid rotation matrix, $F_{U,\mu}$ is the trained shape deformation model, $\Gamma_{a_k}$ is the trained pose deformation model, $\hat{v}_{k,j}$ denotes edges of a triangle in the template mesh, y denotes vertices of the estimated avatar mesh model, L is the set of correspondences between the avatar vertex $y_l$ and the corresponding point $z_l$ in the 3D point cloud, $d_{cloth}(Y)$ is a clothing constraint, $d_{table}(Y)$ is a table constraint, and $s(Y)$ is a smoothing constraint.

11. The method of claim 10, wherein $d_{cloth}(Y) = \Sigma_{l \in L} \|\epsilon_l + n_{z_l}^T(z_l - y_l)\|^2$, where $n_{z_l}$ is the normal of the point $z_l$, a vertex of the avatar mesh is below the 3D point cloud when $n_{z_l}^T(z_l - y_l) > 0$, $\forall l \in L$, $\epsilon_l$ is determined by $e_k = (1 - P(y_k))\tau$, where $k \in X$, $P(y_k)$ represents a probability, calculated using a trained probability model, that a vertex $y_k$ of the 3D avatar mesh belongs to a non-clothing region, and $\tau$ is a threshold that represents the maximal distance between the avatar surface and the clothing surface, including the thickness of the clothing.

12. The method of claim 10, wherein $d_{table}(Y) = \Sigma_{k \in X, y_k^z < h_{table}} \|\epsilon_{table} + y_k^z - h_{table}\|^2$, where $y_k^z$ is a z-axis value of the avatar vertex $y_k$, $h_{table}$ is the current table height, and $e_{table}$ ensures that the avatar mesh lies sufficiently above the table.

13. The method of claim 10, wherein $$s(y) = \sum_{k \in X} \left\| (y_k - \hat{y}_k) - \frac{1}{[N_k]} \sum_{j \in N_k} (y_j - \hat{y}_j) \right\|^2,$$

where y denotes the vertices of a new avatar mesh, $\hat{y}$ denotes the vertices of a current avatar mesh, and $N_k$ is the set of vertices adjacent to the vertex $y_k$.

14. The method of claim 1, wherein generating a personalized 3D avatar mesh of the subject by optimizing the 3D avatar mesh using a trained parametric deformable model (PDM) comprises:

(a) generating a current 3D avatar mesh by optimizing the 3D avatar mesh using the PDM based on a set of correspondences initially including correspondences between the anatomical landmarks detected in the 3D point cloud and corresponding anatomical landmarks in the 3D avatar mesh;

(b) performing a full registration between the current 3D avatar mesh and the 3D point cloud;

(c) removing correspondences for which a distance between vertex in the 3D avatar mesh and the corresponding point in the 3D point cloud is greater than a threshold from the set of correspondences;

(d) re-aligning the current 3D avatar mesh to the 3D point cloud based on the remaining correspondences in the set of correspondences; and (e) repeating steps (a)-(d) until the current 3D avatar mesh converges.

15. The method of claim 14, wherein generating a current 3D avatar mesh by optimizing the 3D avatar mesh using the PDM based on a set of correspondences initially including correspondences between the anatomical landmarks detected in the 3D point cloud and corresponding anatomical landmarks in the 3D avatar mesh comprises:

optimizing a rigid rotation matrix to determine a pose deformation of the template mesh that results in an optimal pose for the current 3D avatar mesh, while keeping a shape deformation of the template mesh and vertices of the current 3D avatar mesh fixed;

optimizing locations of the vertices of the current 3D mesh to fine tune the locations of the vertices based on the 3D point cloud, while keeping the rigid rotation matrix and the shape deformation of the template mesh fixed; and optimizing the shape deformation of the template mesh to determine a shape deformation that results in an optimal shape for the current 3D avatar mesh, while keeping the rigid rotation matrix, the pose deformation, and the vertices of the current 3D avatar mesh fixed.

16. The method of claim 15, wherein generating a current 3D avatar mesh by optimizing the 3D avatar mesh using the PDM based on a set of correspondences initially including correspondences between the anatomical landmarks detected in the 3D point cloud and corresponding anatomical landmarks in the 3D avatar mesh further comprises:

iterating optimization of the rigid rotation matrix, the optimization of the locations of the vertices of the current 3D avatar mesh, and the optimization of the shape deformation for a plurality of iterations.

17. The method of claim 1, further comprising:

determining a scan plan for medical image acquisition based on the personalized 3D avatar mesh of the subject.

18. The method of claim 17, wherein determining a scan plan for medical image acquisition based on the personalized 3D avatar mesh of the subject comprises:

detecting a patient iso-center using the 3D-avatar mesh of the subject; and determining the scan plan for medical image acquisition based on the patient iso-center.

19. The method of claim 17, wherein determining a scan plan for medical image acquisition based on the personalized 3D avatar mesh of the subject comprises:

detecting a location of at least one organ of the subject based on the 3D-avatar mesh of the subject; and determining the scan plan for medical image acquisition based on the location of the at least one organ.

20. An apparatus for generating a personalized 3D avatar mesh of a subject from a depth camera image for medical imaging scan planning, comprising:

means for converting a depth camera image of a subject to a 3D point cloud;

means for detecting a plurality of anatomical landmarks in the 3D point cloud;

means for initializing a 3D avatar mesh by aligning a template mesh to the 3D point cloud based on the detected anatomical landmarks; and means for generating a personalized 3D avatar mesh of the subject by optimizing the 3D avatar mesh using a trained parametric deformable model (PDM)

wherein the means for generating a personalized 3D avatar mesh of the subject by optimizing the 3D avatar mesh using a trained parametric deformable model (PDM) comprises:

means for optimizing parameters of the trained PDM that control a pose and shape of the 3D avatar mesh and locations of vertices of the 3D avatar mesh to minimize a cost function and wherein the cost function includes a table constraint that causes the optimization to move vertices of the 3D avatar above a table on which the subject is lying.

21. The apparatus of claim 20, wherein the means for detecting a plurality of anatomical landmarks in the 3D point cloud comprises:

means for detecting a plurality of joint landmarks corresponding to locations of the subject's joints in the 3D point cloud.

22. The apparatus of claim 20, wherein the trained PDM comprises a trained pose deformation model and a trained shape deformation model.

23. The apparatus of claim 20, wherein the cost function includes a clothing constraint that causes the optimization to move vertices of the 3D avatar in a clothing region below corresponding points of the 3D point cloud.

24. The apparatus of claim 23, wherein the clothing constraint is based on a probability calculated for each vertex of the 3D avatar mesh that the vertex in is a non-clothing region and the probability for each vertex is calculated using a trained probability model.

25. The apparatus of claim 20, wherein the cost function includes smoothness constraint that penalizes deformations of a vertex in the 3D avatar mesh that different from an average deformation of neighboring vertices to that vertex.

26. The apparatus of claim 20, wherein the means for generating a personalized 3D avatar mesh of the subject by optimizing the 3D avatar mesh using a trained parametric deformable model (PDM) comprises:

means for generating a current 3D avatar mesh by optimizing the 3D avatar mesh using the PDM based on a set of correspondences initially including correspondences between the anatomical landmarks detected in the 3D point cloud and corresponding anatomical landmarks in the 3D avatar mesh;

means for performing a full registration between the current 3D avatar mesh and the 3D point cloud;

means for removing correspondences for which a distance between vertex in the 3D avatar mesh and the corresponding point in the 3D point cloud is greater than a threshold from the set of correspondences; and means for re-aligning the current 3D avatar mesh to the 3D point cloud based on the remaining correspondences in the set of correspondences.

27. The apparatus of claim 26, wherein the means for generating a current 3D avatar mesh by optimizing the 3D avatar mesh using the PDM based on a set of correspondences initially including correspondences between the anatomical landmarks detected in the 3D point cloud and corresponding anatomical landmarks in the 3D avatar mesh comprises:

means for optimizing a rigid rotation matrix to determine an pose deformation of the template mesh that results in an optimal pose for the current 3D avatar mesh, while keeping a shape deformation of the template mesh and vertices of the current 3D avatar mesh fixed;

means for optimizing locations of the vertices of the current 3D mesh to fine tune the locations of the vertices based on the 3D point cloud, while keeping the rigid rotation matrix and the shape deformation of the template mesh fixed; and means for optimizing the shape deformation of the template mesh to determine a shape deformation that results in an optimal shape for the current 3D avatar mesh, while keeping the rigid rotation matrix, the pose deformation, and the vertices of the current 3D avatar mesh fixed.

28. The apparatus of claim 20, further comprising:

means for determining a scan plan for medical image acquisition based on the personalized 3D avatar mesh of the subject.

29. The apparatus of claim 28, wherein the means for determining a scan plan for medical image acquisition based on the personalized 3D avatar mesh of the subject comprises:

means for detecting a patient iso-center using the 3D-avatar mesh of the subject; and means for determining the scan plan for medical image acquisition based on the patient iso-center.

30. The apparatus of claim 28, wherein the means for determining a scan plan for medical image acquisition based on the personalized 3D avatar mesh of the subject comprises:

means for detecting a location of at least one organ of the subject based on the 3D-avatar mesh of the subject; and means for determining the scan plan for medical image acquisition based on the location of the at least one organ.

31. A non-transitory computer readable medium storing computer program instructions for generating a personalized 3D avatar mesh of a subject from a depth camera image for medical imaging scan planning, the computer program instructions when executed by a processor cause to processor to perform operations comprising:

converting a depth camera image of a subject to a 3D point cloud;

detecting a plurality of anatomical landmarks in the 3D point cloud;

initializing a 3D avatar mesh by aligning a template mesh to the 3D point cloud based on the detected anatomical landmarks; and generating a personalized 3D avatar mesh of the subject by optimizing the 3D avatar mesh using a trained parametric deformable model (PDM)

wherein generating a personalized 3D avatar mesh of the subject by optimizing the 3D avatar mesh using a trained parametric deformable model (PDM) comprises:

optimizing parameters of the trained PDM that control a pose and shape of the 3D avatar mesh and locations of vertices of the 3D avatar mesh to minimize a cost function and wherein the cost function includes a table constraint that causes the optimization to move vertices of the 3D avatar above a table on which the subject is lying.

32. The non-transitory computer readable medium of claim 31, wherein the depth camera image comprises an red, green, blue (RGB) image and a depth image, and converting a depth camera image of a subject to a 3D point cloud comprises:

for each of a plurality of pixels in the RGB image, mapping that pixel to a location in the 3D point cloud based on a corresponding depth value in the depth image.

33. The non-transitory computer readable medium of claim 31, wherein detecting a plurality of anatomical landmarks in the 3D point cloud comprises:

detecting a plurality of joint landmarks corresponding to locations of the subject's joints in the 3D point cloud.

34. The non-transitory computer readable medium of claim 31, wherein detecting a plurality of anatomical landmarks in the 3D point cloud comprises:

detecting each of the plurality of anatomical landmarks using a respective trained classifier.

35. The non-transitory computer readable medium of claim 31, wherein the trained PDM comprises a trained pose deformation model and a trained shape deformation model.

36. The non-transitory computer readable medium of claim 31, wherein the cost function includes a clothing constraint that causes the optimization to move vertices of the 3D avatar in a clothing region below corresponding points of the 3D point cloud.

37. The non-transitory computer readable medium of 36, wherein the clothing constraint is based on a probability calculated for each vertex of the 3D avatar mesh that the vertex in is a non-clothing region and the probability for each vertex is calculated using a trained probability model.

38. The non-transitory computer readable medium of claim 31, wherein the cost function includes smoothness constraint that penalizes deformations of a vertex in the 3D avatar mesh that different from an average deformation of neighboring vertices to that vertex.

39. The non-transitory computer readable medium of claim 31, wherein generating a personalized 3D avatar mesh of the subject by optimizing the 3D avatar mesh using a trained parametric deformable model (PDM) comprises:

(a) generating a current 3D avatar mesh by optimizing the 3D avatar mesh using the PDM based on a set of correspondences initially including correspondences between the anatomical landmarks detected in the 3D point cloud and corresponding anatomical landmarks in the 3D avatar mesh;
(b) performing a full registration between the current 3D avatar mesh and the 3D point cloud;
(c) removing correspondences for which a distance between vertex in the 3D avatar mesh and the corresponding point in the 3D point cloud is greater than a threshold from the set of correspondences;
(d) re-aligning the current 3D avatar mesh to the 3D point cloud based on the remaining correspondences in the set of correspondences; and
(e) repeating steps (a)-(d) until the current 3D avatar mesh converges.

40. The non-transitory computer readable medium of claim 39, wherein generating a current 3D avatar mesh by optimizing the 3D avatar mesh using the PDM based on a set of correspondences initially including correspondences between the anatomical landmarks detected in the 3D point cloud and corresponding anatomical landmarks in the 3D avatar mesh comprises:

optimizing a rigid rotation matrix to determine an pose deformation of the template mesh that results in an optimal pose for the current 3D avatar mesh, while keeping a shape deformation of the template mesh and vertices of the current 3D avatar mesh fixed;
optimizing locations of the vertices of the current 3D mesh to fine tune the locations of the vertices based on the 3D point cloud, while keeping the rigid rotation matrix and the shape deformation of the template mesh fixed; and
optimizing the shape deformation of the template mesh to determine a shape deformation that results in an optimal shape for the current 3D avatar mesh, while keeping the rigid rotation matrix, the pose deformation, and the vertices of the current 3D avatar mesh fixed.

41. The non-transitory computer readable medium of claim 40, wherein generating a current 3D avatar mesh by optimizing the 3D avatar mesh using the PDM based on a set of correspondences initially including correspondences between the anatomical landmarks detected in the 3D point cloud and corresponding anatomical landmarks in the 3D avatar mesh further comprises:

iterating optimization of the rigid rotation matrix, the optimization of the locations of the vertices of the current 3D avatar mesh, and the optimization of the shape deformation for a plurality of iterations.

42. The non-transitory computer readable medium of claim 31, wherein the operations further comprise:

determining a scan plan for medical image acquisition based on the personalized 3D avatar mesh of the subject.

43. The non-transitory computer readable medium of claim 42, wherein determining a scan plan for medical image acquisition based on the personalized 3D avatar mesh of the subject comprises:

detecting a patient iso-center using the 3D-avatar mesh of the subject; and
determining the scan plan for medical image acquisition based on the patient iso-center.

44. The non-transitory computer readable medium of claim 42, wherein determining a scan plan for medical image acquisition based on the personalized 3D avatar mesh of the subject comprises:

detecting a location of at least one organ of the subject based on the 3D-avatar mesh of the subject; and
determining the scan plan for medical image acquisition based on the location of the at least one organ.

* * * * *